Sept. 11, 1951     J. C. FROMMER     2,567,880

VOLTAGE REGULATOR

Filed July 5, 1947     2 Sheets—Sheet 1

INVENTOR.
JOSEPH C. FROMMER
BY

Sept. 11, 1951   J. C. FROMMER   2,567,880
VOLTAGE REGULATOR
Filed July 5, 1947   2 Sheets-Sheet 2

INVENTOR.
JOSEPH C. FROMMER
BY

Patented Sept. 11, 1951

2,567,880

UNITED STATES PATENT OFFICE 2,567,880

VOLTAGE REGULATOR

Joseph C. Frommer, Cincinnati, Ohio, assignor to Clippard Instrument Laboratories, Inc., Cincinnati, Ohio, a corporation of Ohio Application July 5, 1947, Serial No. 759,282

6 Claims. (Cl. 323—38)

This invention relates to vacuum tube voltage regulators for regulating the voltage of direct current sources.

Vacuum tube voltage regulators are known wherein a regulating or power tube is arranged in series with the output of a rectifier and a portion of the output voltage of this rectifier, after amplification in a preamplifier tube, is impressed upon the grid of said power or regulating tube to vary the internal resistance of the latter. In their conventional form these voltage regulators are not applicable to the regulation of voltages below a relatively high positive value, say 100 volts. It has been proposed to use two such voltage regulators together in such a manner that the voltage controlled by the one voltage regulator is subtracted from the voltage controlled by the second voltage regulator, whereby output voltage regulation down to zero voltage may be achieved. The present invention has for a main object the provision of a vacuum tube voltage regulator which permits the regulation of voltages down to zero voltage, and if desired, even into the negative range by means of a very simple and inexpensive circuit which does not involve the subtraction method mentioned.

Another object of the invention is to provide a voltage regulator wherein the voltage which is to be regulated in comparison with a stable reference voltage, such as the voltage across a voltage stabilizing tube, may be so regulated down to a voltage which is lower than said reference voltage.

A further object of the invention is to provide additionally to the load circuit of a voltage regulator, a source of relatively high negative potential to which the grid of the power tube is connected through one arm of a voltage divider whose other arm connects to the plate of the preamplifier tube.

A further object of the invention is to provide a voltage regulator wherein the positive electrode of the above mentioned voltage stabilizer is connected to the negative lead of the load circuit and the negative electrode of the stabilizer is subjected to a potential derived from the source of relatively high negative potential.

Still a further object of the invention is to connect the two electrodes of the voltage stabilizer by means of a resistor and to provide a voltage divider between a point of this resistor and the cathode of the power tube, with the mid point of this voltage divider connected to the grid of the preamplifier tube.

Figure 1:
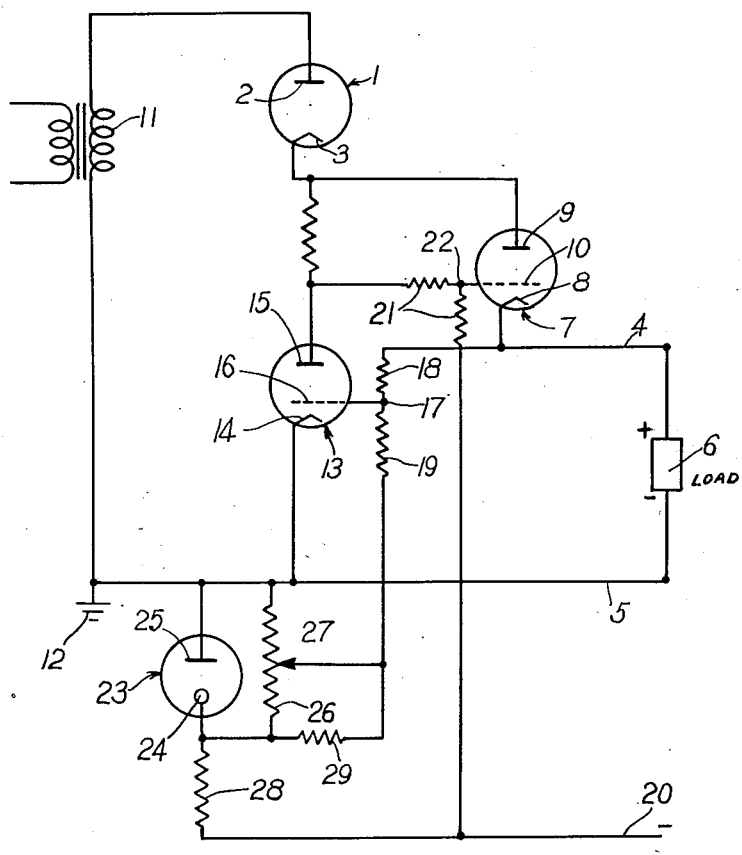
Figure 2:
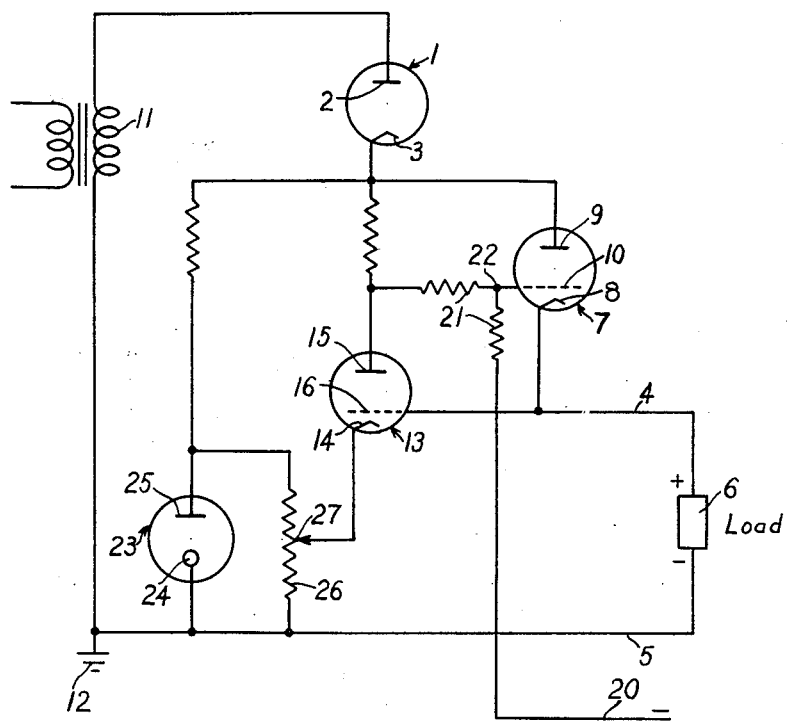

Other objects and advantages of the invention will appear as the description proceeds, reference being had to the accompanying drawing whose Figs. 1 and 2 show by way of example the diagrams of two circuits each embodying the invention.

Referring first to Fig. 1, 1 denotes a source of direct current, which in the example shown is a rectifier tube having a plate 2 and a cathode 3. 4 denotes the positive lead and 5 the negative lead of a load circuit containing a load 6 which is in series with a regulating or power tube 7 having a cathode 8, a plate 9 and between cathode and plate one or more grids of which only a control grid 10 is shown. The cathode 8 of this power tube is connected to the positive lead 4, whereas the plate 9 is connected to the cathode of the rectifier tube 1 whose plate 2 is connected to one end of a source of alternating current, such as a transformer secondary coil 11 whose other end is connected to the negative lead 5 of the load circuit. This negative lead may be grounded as indicated at 12.

20 denotes a lead connected to a source of relatively high negative potential, e. g. —300 volts relative to line 5, obtained, e. g. by a rectifier, not shown in the drawing.

13 is a preamplifier tube having a cathode 14, a plate 15 and one or more grids of which again only a control grid 16 is shown. Between the plate 15 of the preamplifier tube and the source of high negative potential 20 there is arranged a voltage divider 21 whose mid point 22 is connected to the grid 10 of the power tube 7. The cathode 14 and the grid 16 of the preamplifier 13 are placed in the circuit in a manner to be presently described.

23 denotes a voltage stabilizing tube, such as a neon tube, having a negative electrode 24 and a positive electrode 25, the latter being connected to the negative lead 5 of the load circuit. Parallel to the tube 23 there is a potentiometer 26 to a point of which the cathode 14 of the preamplifier tube 13 is connected. In the example shown this cathode is connected to the positive end point of the potentiometer 26. Arranged between the cathode 8 of the power tube 7 and the variable tap point 27 of the potentiometer 26 is a second voltage divider 18, 19 whose mid point 17 is connected to the grid 16 of the preamplifier tube. 28 is a resistor connecting the negative electrode 24 of the voltage stabilizer to the source of high negative potential 20. A further resistor 29 may be arranged parallel to that part of the potentiometer 26 which extends between the negative end of the stabilizer tube 23 and the variable tap point 27.

If the voltage across the load 6 tends to vary, the grid 16 of the preamplifier tube conducts more or less current depending on the sense of such variation. In case of an increase in load voltage, the preamplifier grid becomes more positive, making the preamplifier plate 15 more negative. This decreases the potential applied to the power tube grid 10 so that the internal resistance of this power tube rises and decreases the load voltage. In case of a drop of load voltage, the preamplifier grid 16 becomes more negative, conducting, therefore, less current so that the plate 15 becomes more positive and causes the power tube 7 to increase the load voltage.

Due to the provision of the source of high negative potential 20 and the connection of the grid 10 of the power tube 7 to this source by means of the voltage divider 21, the potential of this grid is always substantially lower than the voltage of the plate 15 of the preamplifier tube 13 and the heretofore existing limitation as to the lower limit to which the load voltage could be regulated with a single set of power tube and preamplifier tube is completely removed. While the arrangement shown, where the negative lead 5 is connected to ground, permits regulation down to zero voltage, said negative lead could be held on a negative potential relative to ground to enable the control also of negative voltages.

By moving the variable tap point 27 of the potentiometer 26, the load voltage can be varied between a maximum and a minimum value, both values depending upon the electrical characteristics of the circuit, in particular upon the resistance values of the two voltage dividers 21 and 18, 19. These resistance values have to be chosen according to the range within which the load voltage is desired to be variable, the resistance value of the resistor 19 to be chosen the higher and the resistance value of the vertical arm of the voltage divider 21 the lower, the lower the load voltage range is to be. In this manner the voltage regulator is adaptable to widely different ranges of output voltages, in particular also to such ranges as were not controllable by conventional single set vacuum tube voltage regulators, e. g. 50 to 150 volts, 10 to 75 volts or 0 to 15 volts.

The regulation obtainable with the new circuit is a very close one. To give an example: A regulator according to the invention designed for a load voltage range of 0 to 15 volts and so as to be at a state of equilibrium at a load current consumption of 35 ma. with the load voltage at this consumption being 10 volts, required for the reduction of the current consumption to 5 ma. a change in the potential of the grid 16 of the preamplifier tube 13 not greater than .1 volt, causing thereby a change in the output voltage of .11 volt. Thus, said change in load current consumption from 35 ma. to 5 ma. caused no greater increase of the load voltage than from 10 volts to 10.11 volts.

The cathode of the preamplifier tube 13, instead of being connected to the positive end point of the resistance 26 across the stabilizing tube 23, may be connected to an intermediate point of that resistance. This is shown in Fig. 2 which further shows the grid 16 of the preamplifier tube 13 connected directly to the positive lead 4 of the load circuit, instead of being connected to the midpoint of the voltage divider 18, 19, as in the arrangement of Fig. 1. The way in which the cathode and grid of the preamplifier are connected according to Fig. 1 is, however, preferable because it permits a closer regulation than the alternative shown in Fig. 2. It will be noted that according to Fig. 2 the voltage stabilizer tube 23 is inserted into the circuit in a more or less conventional manner, the electrode of the stabilizer tube connected to the negative side 5 of the load 6 being the negative electrode 24 and not the positive electrode 25 as in Fig. 1, where the negative electrode 24 is connected through the resistor 28 to the highly negative lead 20.

While I have shown in the drawing two specific forms in which the invention may be practiced, I desire it to be understood that these specific forms have been given by way of example only and that various changes may be made in the details of the circuits without departing from the spirit of the invention or the scope of the appended claims. For instance, it will be obvious to those skilled in the art that, while a half-wave rectifier is shown in the drawing, a full-wave rectifier may be used and that, even though no filtering means are indicated, such may be used in well known manner.

What I claim is:

1. In a voltage regulator, a D. C. power supply having a positive and a negative terminal, a load circuit including a positive lead and a negative lead connected respectively to the positive side and the negative side of the load, a source of relatively high negative potential with respect to said negative terminal, a preamplifier tube and a power tube having each a cathode, a plate and at least a control grid therebetween, the plate of said power tube being connected to said positive terminal of said power supply and the cathode of this tube to the positive side of the load, whereas the negative side of the load is connected to said negative terminal of said power supply, a voltage divider between the plate of said preamplifier tube and said source of relatively high negative potential having its mid point connected to the control grid of said power tube, a voltage stabilizer having a positive electrode and a negative electrode, a second voltage divider connecting said two electrodes, said positive electrode being connected to said negative lead of said load circuit and said negative electrode being at a potential derived from said source of relatively high negative potential, and a third voltage divider between the cathode of said power tube and a point of said second voltage divider connecting said voltage stabilizer electrodes, the mid point of said third voltage divider being connected to the control grid of said preamplifier tube.

2. In a voltage regulator, a D. C. power supply having a positive and a negative terminal, a load circuit including a positive lead and a negative lead connected respectively to the positive side and the negative side of the load, a source of relatively high negative potential with respect to said negative terminal, a preamplifier tube and a power tube having each a cathode, a plate and at least a control grid therebetween, the plate of said power tube being connected to said positive terminal of said power supply and the cathode of this tube to the positive side of the load, whereas the negative side of the load is connected to said negative terminal of said power supply, a voltage divider between the plate of said preamplifier tube and said source of relatively high negative potential having its mid point connected to the control grid of said power tube, a voltage stabilizer having a positive electrode and a negative electrode, a second voltage divider connecting said two electrodes, said positive electrode being connected to said negative lead of said load circuit, and said negative electrode being at a potential derived from said source of relatively high negative potential, and a third voltage divider between the cathode of said power tube and a variable tap point of said second voltage divider connecting said voltage stabilizer electrodes, the mid point of said third voltage divider being connected to the control grid of said preamplifier tube.

3. In a voltage regulator, a D. C. power supply having a positive and a negative terminal, a load circuit including a positive lead and a negative lead connected respectively to the positive side and the negative side of the load, a source of relatively high negative potential with respect to said negative terminal, a preamplifier tube and a power tube having each a cathode, a plate and at least a control grid therebetween, the plate of said power tube being connected to said positive terminal of said power supply and the cathode of this tube to the positive side of the load, whereas the negative side of the load is connected to said negative terminal of said power supply, the cathode of said preamplifier tube being connected to said negative lead of said load circuit, a voltage divider between the plate of said preamplifier tube and said source of relatively high negative potential having its mid point connected to the control grid of said power tube, a voltage stabilizer having a positive electrode and a negative electrode, a second voltage divider connecting said two electrodes, said positive electrode being connected to said negative lead of said load circuit and said negative electrode being at a potential derived from said source of relatively high negative potential, and a third voltage divider between the cathode of said power tube and a point of said second voltage divider connecting said voltage stabilizer electrodes, the mid point of said third voltage divider being connected to the control grid of said preamplifier tube.

4. In a voltage regulator, a D. C. power supply having a positive and a negative terminal, a load circuit including a positive lead and a negative lead connected respectively to the positive side and the negative side of the load, a source of relatively high negative potential with respect to said negative terminal, a preamplifier tube and a power tube having each a cathode, a plate and at least a control grid therebetween, the plate of said power tube being connected to said positive terminal of said power supply and the cathode of this tube to the positive side of the load, whereas the negative side of the load is connected to said negative terminal of said power supply, a voltage divider between the plate of said preamplifier tube and said source of relatively high negative potential having its mid point connected to the control grid of said power tube, a voltage stabilizer having a positive electrode and a negative electrode, said positive electrode being connected to said negative lead of said load circuit and said negative electrode being connected to said source of relatively high negative potential through a resistor and to said negative lead of the load circuit through a second voltage divider, and a third voltage divider between the cathode of said power tube and a point of said second voltage divider connecting the two electrodes of said voltage stabilizer, the mid point of said third voltage divider being connected to the control grid of said preamplifier tube.

5. In a voltage regulator, a D. C. power supply having a positive and a negative terminal, a load circuit including a positive lead and a negative lead connected respectively to the positive side and the negative side of the load, a source of relatively high negative potential with respect to said negative terminal, a preamplifier tube and a power tube having each a cathode, a plate and at least a control grid therebetween, the plate of said power tube being connected to said positive terminal of said power supply and the cathode of this tube to the positive side of the load, whereas the negative side of the load is connected to said negative terminal of said power supply, a voltage divider between the plate of said preamplifier tube and said source of relatively high negative potential having its mid point connected to the control grid of said power tube, a voltage stabilizer having a positive electrode and a negative electrode, said positive electrode being connected to said negative lead of said load circuit and said negative electrode being connected to said source of relatively high negative potential through a resistor and to said negative lead of the load circuit through a second voltage divider, and a third voltage divider between the cathode of said power tube and a variable tap point of said second voltage divider connecting the two electrodes of said voltage stabilizer, the mid point of said third voltage divider being connected to the control grid of said preamplifier tube.

6. In a voltage regulator, a D. C. power supply having a positive and a negative terminal, a load circuit including a positive lead and a negative lead connected respectively to the positive side and the negative side of the load, a source of relatively high negative potential with respect to said negative terminal, a preamplifier tube and a power tube having each a cathode, a plate and at least a control grid therebetween, the plate of said power tube being connected to said positive terminal of said power supply and the cathode of this tube to the positive side of the load, whereas the negative side of the load is connected to said negative terminal of said power supply, a voltage divider between the plate of said preamplifier tube and said source of relatively high negative potential having its mid point connected to the control grid of said power tube, a voltage stabilizer having a positive electrode and a negative electrode, said positive electrode being connected to said negative lead of said load circuit and said negative electrode being connected to said source of relatively high negative potential through a resistor and to said positive electrode through a voltage divider, the cathode of said preamplifier tube being connected to the positive end point of that voltage divider which connects said two electrodes of said voltage stabilizer, and a third voltage divider between the cathode of said power tube and a point of said voltage divider connecting the two electrodes of said voltage stabilizer, the mid point of said third voltage divider being connected to the control grid of said preamplifier tube.

JOSEPH C. FROMMER.

REFERENCES CITED

The following references are of record in the file of this patent:

UNITED STATES PATENTS

| Number | Name | Date |
| --- | --- | --- |
| 2,075,966 | Vance | Apr. 6, 1937 |
| 2,120,884 | Brown | June 14, 1938 |
| 2,268,790 | White | Jan. 6, 1942 |
| 2,274,364 | Gardiner | Feb. 24, 1942 |
| 2,316,577 | Ford | Apr. 13, 1943 |
| 2,401,096 | Paradise | May 28, 1946 |
| 2,434,069 | Goldberg | Jan. 6, 1948 |
| 2,484,724 | Paradise | Oct. 11, 1949 |